(12) United States Patent
VanBurch et al.

(10) Patent No.: US 7,975,425 B1
(45) Date of Patent: Jul. 12, 2011

(54) NUISANCE CARP CONTROL MEASURES

(76) Inventors: Kirby VanBurch, Branson, MO (US);
Bambi Sue VanBurch, Branson, MO (US)

( * ) Notice: Subject to any disclaimer, the term of this patent is extended or adjusted under 35 U.S.C. 154(b) by 774 days.

(21) Appl. No.: 12/001,489

(22) Filed: Dec. 10, 2007

Related U.S. Application Data

(60) Provisional application No. 60/873,732, filed on Dec. 8, 2006, provisional application No. 60/874,187, filed on Dec. 9, 2006, provisional application No. 60/937,020, filed on Jun. 25, 2007.

(51) Int. Cl.
*A01K 79/02* (2006.01)
(52) U.S. Cl. .................... 43/17.1; 43/4
(58) Field of Classification Search ............ 119/201, 119/215, 216; 43/17.1, 4, 4.5, 100, 101, 43/103
See application file for complete search history.

(56) References Cited

U.S. PATENT DOCUMENTS

| | | | |
|---|---|---|---|
| 1,292,246 A | 1/1919 | Burkey | 119/220 |
| 1,515,547 A | 11/1924 | Burkey | 119/220 |
| 1,583,124 A | 5/1926 | Coffland | 56/249.5 |
| 1,974,444 A | 9/1934 | Burkey | 119/220 |
| 2,778,140 A | 1/1957 | Applegate et al. | 43/17.1 |
| 2,991,421 A | 7/1961 | Volz | 119/220 |
| 3,754,603 A | 8/1973 | Bogie | 172/45 |
| 3,775,890 A * | 12/1973 | Puretic | 43/6.5 |
| 4,825,810 A | 5/1989 | Sharber | 119/220 |
| 4,920,737 A | 5/1990 | Wieneke | 56/249 |
| 4,924,619 A * | 5/1990 | Dowell | 43/6 |
| 4,951,410 A * | 8/1990 | Ly | 43/17.1 |
| 5,003,759 A | 4/1991 | Brown | 56/249 |
| 5,018,309 A | 5/1991 | Wyss | 451/65 |
| 5,214,873 A * | 6/1993 | Sharber | 43/17.1 |
| 5,235,774 A * | 8/1993 | Burghoff | 43/17.1 |
| 5,445,111 A | 8/1995 | Smith | 119/220 |
| 6,453,596 B1 * | 9/2002 | Marco | 43/4.5 |
| 6,457,436 B1 | 10/2002 | Truebe et al. | 119/219 |
| 6,634,626 B2 | 10/2003 | Petrescu et al. | 261/92 |
| 6,691,792 B2 | 2/2004 | Keane | 174/14 |
| 6,978,734 B1 | 12/2005 | Smith et al. | 119/220 |

OTHER PUBLICATIONS

YouTube Internet Video, Bow Fishing Asian Carp, Relentless Pursuit , http://www.youtube.com/watch?v=gElu4l4mNVQ, Jul. 2, 2007.*

* cited by examiner

*Primary Examiner* — Kimberly S Smith
(74) *Attorney, Agent, or Firm* — Jonathan A. Bay

(57) ABSTRACT

Measures for controlling nuisance-carp populations include a harvest apparatus for harvesting not sub-surface fish but fish that leap out of the water proximate the harvest apparatus. Detectors detect when subsurface fish are within proximity of the effective range of the harvest apparatus and, when such are detected, a stimulus is applied which causes target fish like nuisance carp but not desirable fish to leap out of the water. When that happens, the harvest apparatus takes its toll on the leaping fish, harmlessly to the desirable fish which do not leap, and instead might flee from the stimulus by diving deeper.

19 Claims, 10 Drawing Sheets

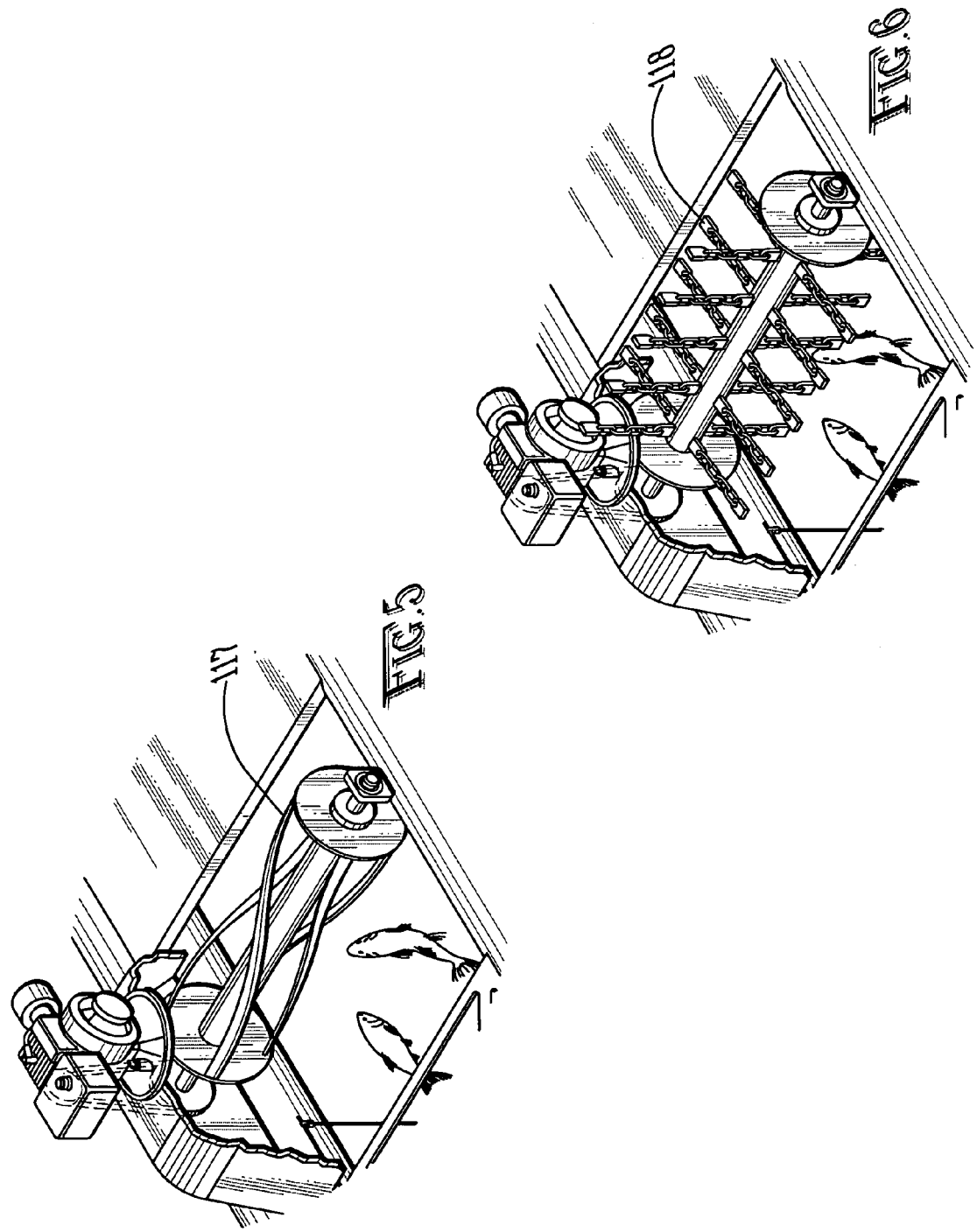

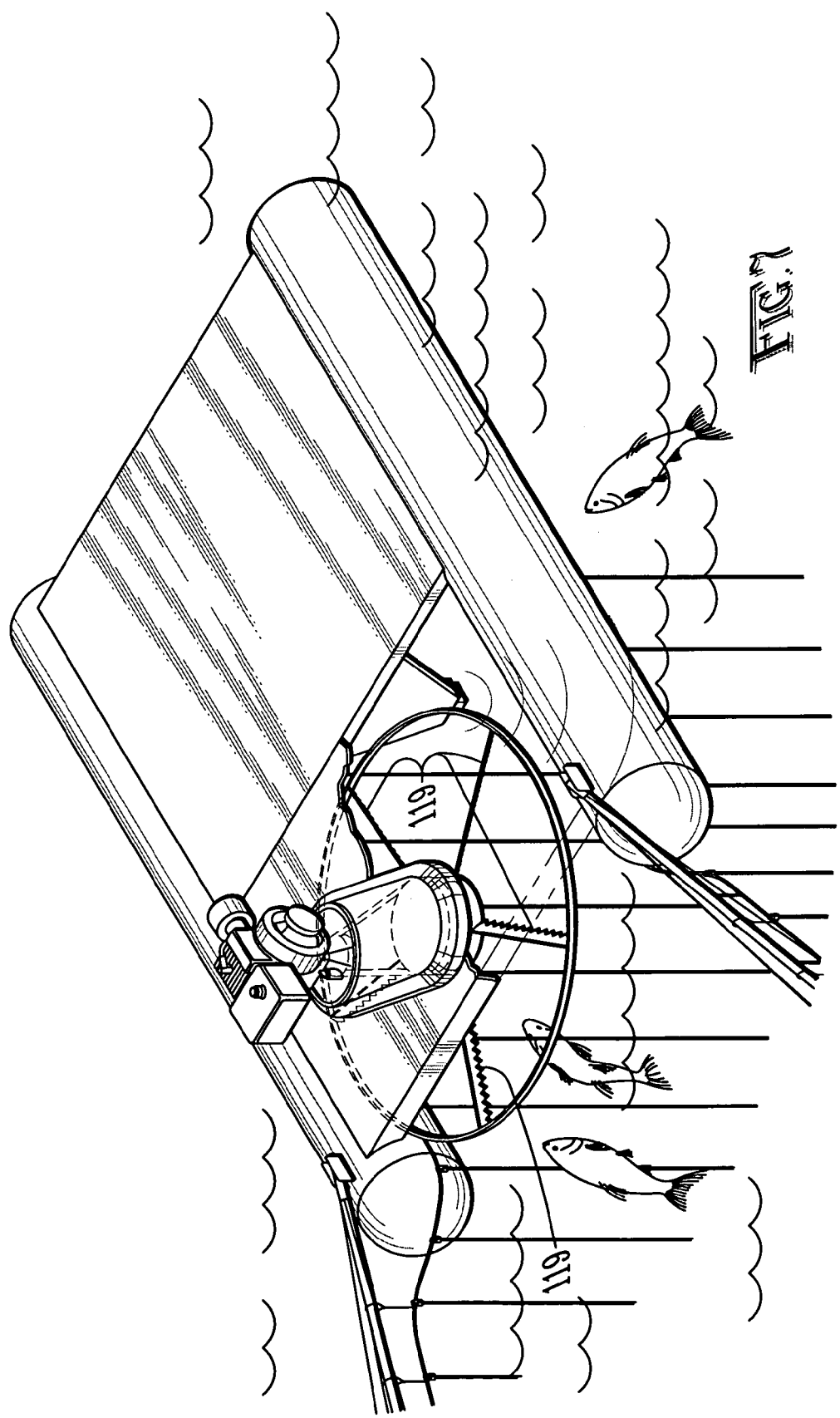

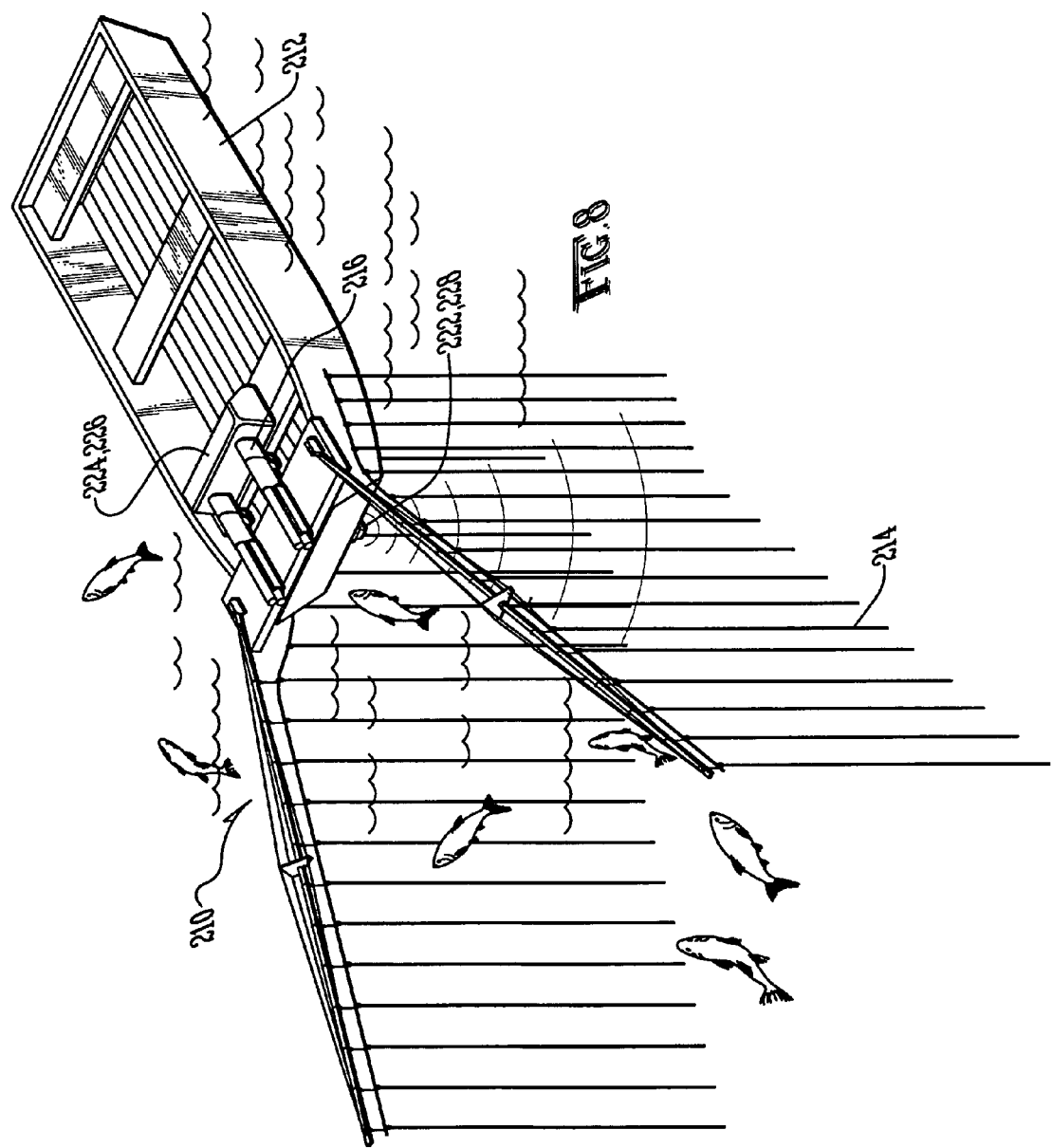

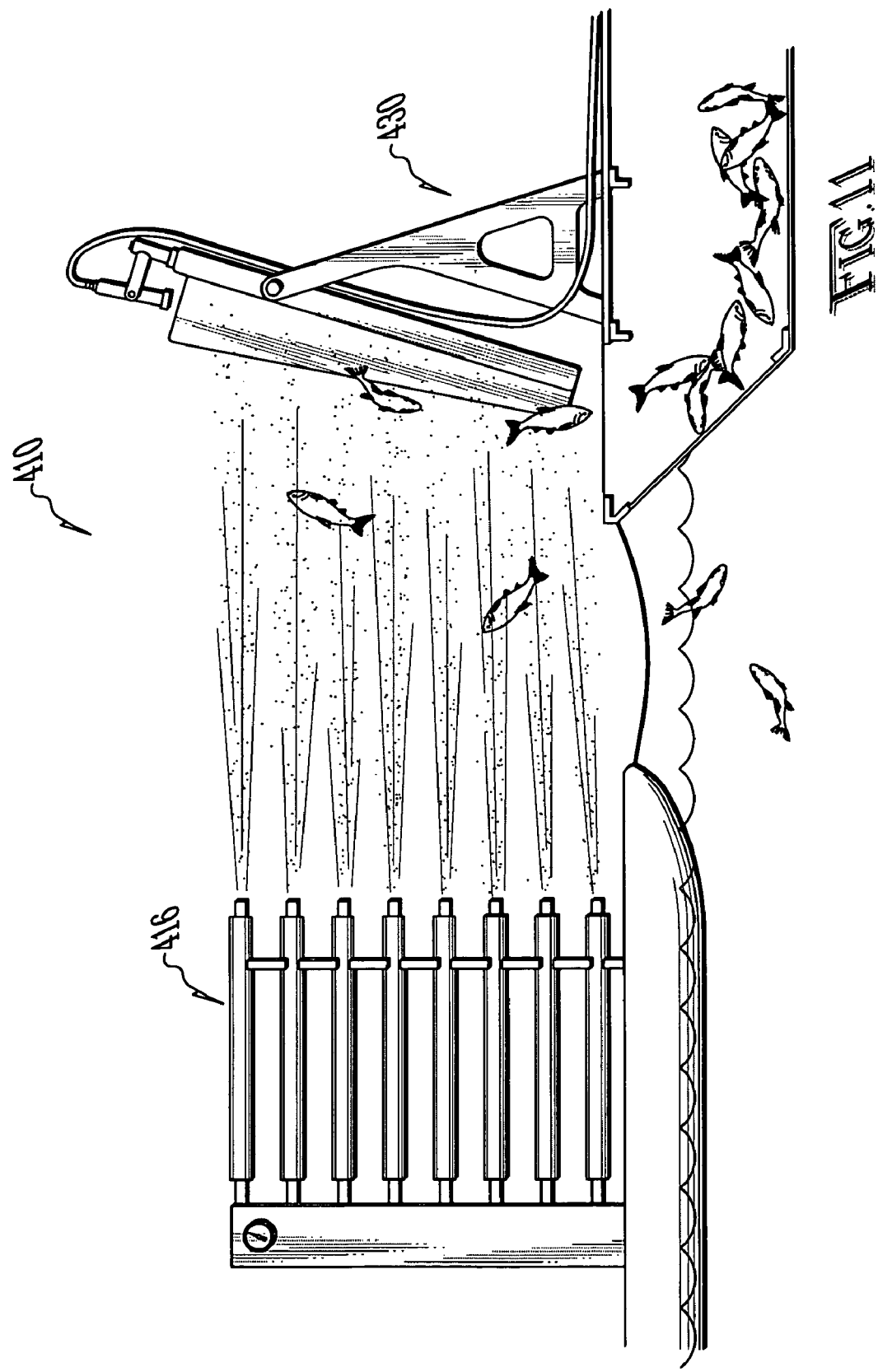

NUISANCE CARP CONTROL MEASURES

CROSS-REFERENCE TO PROVISIONAL APPLICATION(S)

This application claims the benefit of U.S. Provisional Application No. 60/873,732, filed Dec. 8, 2006; U.S. Provisional Application No. 60/874,187, filed Dec. 9, 2006; and U.S. Provisional Application No. 60/937,020, filed Jun. 25, 2007. The disclosures of all the foregoing are incorporated herein by this reference thereto.

BACKGROUND AND SUMMARY OF THE INVENTION

The invention relates to fish culturing including electric type fish diverter or barrier and, most particularly, to control measures for Asian carp considered an invasive or nuisance species in selected bodies of waters/waterways.

It is an aspect of the invention to utilize for advantage the quirky habit of Asian carp to leap out of the water when so stimulated. This quirky habit may be some sort of innate flee or flight reflex. Regardless, it is a well-documented habit.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 5 is a perspective view of apparatus comparable to FIGS. 2-4 except showing an alternate design for the harvesting impeller;

FIG. 6 is a perspective view comparable to FIG. 5 except showing still another design for the harvesting impeller;

FIG. 7 is a perspective view comparable to FIGS. 5 and 6 except showing still an additional design for the harvesting impeller;

FIG. 8 is a perspective view of an alternative embodiment for apparatus in accordance with the invention to control nuisance carp populations;

FIG. 11 is a perspective view of a further embodiment for apparatus in accordance with the invention to control nuisance carp populations.

DETAILED DESCRIPTION OF THE PREFERRED EMBODIMENTS

Figure 1:
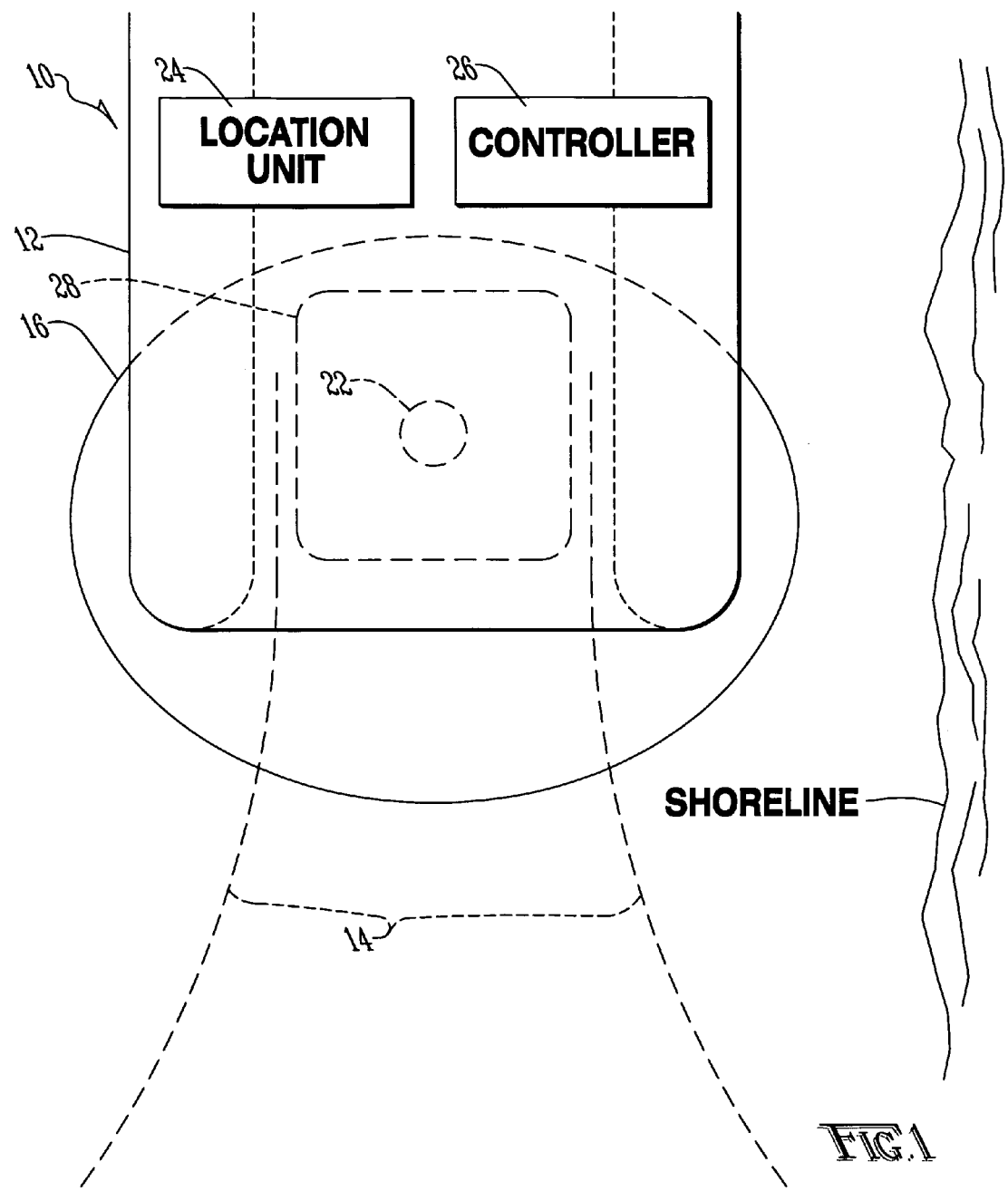
FIG. 1 is a schematic diagram of nuisance-carp control measures in accordance with the invention.

FIG. 1 shows apparatus 10 and methods for practicing nuisance or Asian carp control measures in accordance with the invention in bodies of water/waterways where such are considered an invasive or nuisance species.

More particularly, FIG. 1 shows a harvest station 12 preferably comprising a floating dock or logs and decks of a pontoon boat in order to float the equipment as well as be transportable to strategic locations. In FIG. 1, the harvest station 12 is anchored off the bottom some distance away from the shoreline or shorelines. The harvest station 12 serves as the focal point for one or more weirs 14 comprising electric diverters or barriers for funneling the Asian carp to the harvest station. Such apparatus are disclosed for example and without limitation by:

U.S. Pat. No. 1,974,444—Burkey;
U.S. Pat. No. 2,778,140—Applegate et al.
U.S. Pat. No. 2,991,421—Volz;
U.S. Pat. No. 4,825,810—Sharber;
U.S. Pat. No. 5,445,111—Smith; and
U.S. Pat. No. 6,978,734—Smith et al.

Again, the electrified weirs 14 serve to funnel fish to the harvest station 12, and hence are funnel-form. The weirs 14 form a throat or choke point proximate the harvest station 12. The harvest station 12 includes harvest measures 14 to be described more particularly below which are effective to harvest not the sub-surface fish but only fish that leap out of the water. Hence the harvest station 12's harvest measures 16 are arranged in geometry including without limitation a circle or ring. The harvest station 12 further comprises an ultrasonic transducer 22 or any other suitable sensor which is operated by and feeds its return echo to an ultrasound fish location unit 24. Such a transducer 22 and fish location unit 24 are common packages sold at retail for that segment of the consuming public typified by freshwater bass fisherman. These packages of transducer 22 and fish location unit 24 include features such as capability to differentiate relative size of the fish swimming underneath the transducer 22.

The harvest station 12 is furthermore a platform for a master controller 26. The master controller 26 continually monitors the fish location unit 24's output for the event when two conditions are "true" or met concurrently:—

1—detection of a fish or fishes swimming underneath the about the center of geometry of the harvest measures 16; and 2—detection of whether any one the fish exceeds a pre-defined size threshold. When both conditions are met, preferably the master controller 26 executes two functions simultaneously.

Now preliminarily, the harvest station 12 is moreover a platform for suspending a stimulus device 28. Preferably although not exclusively, the stimulus device 28 comprises an electrode in much the same nature as the above-referenced electrified fish barriers or diverters as the weirs 14. The difference is that the stimulus device 28 operates at different voltage and/or current levels, or at different frequency or an otherwise varying output. It is an aspect of the invention that the stimulus is selected according to not just its effectiveness to cause Asian carp to jump out of the water but also its counterpart dissimilar effect on all other, non-target species of aquatic fauna.

That is, it is acceptable if the stimulus device 28 causes non-target-species such as black bass or salmonids—to dive deeper, so long as the stimulus device 28 does not cause such to leap out of the water. It is only the Asian carp that are wanted to leap out of the water.

Alternative stimuli might include without limitation an injection though a subsurface nozzle of a burst of compressed air (not shown). The sudden release of compressed air underwater is known to produce a sound wave in water much like an explosion; and whether it be like a firecracker or stick of dynamite is relative to how highly-pressurized is the released air. This phenomena is advantageously utilized by geophysical survey professionals who map deep ocean bottoms.

To return to the master controller 26, it preferably executes two functions simultaneously when the above-two enumerated conditions are met. That is, the master controller 26 preferably triggers or switches ON the stimulus device 28 and the harvest measures 16 (ie., if the harvest measures 16 are not already continuously ON). The intended result is that Asian carp, if any, shall leap out of the water within the geometry of the harvest measures 16, and the harvest measures 16 will accomplish an effective harvest of such leaping carp. The particular harvest measure or measures 16 implemented in any given situation can be selected from the following devices or devices meant to launch or shoot such harvesters or projectiles:—

Figure 2:
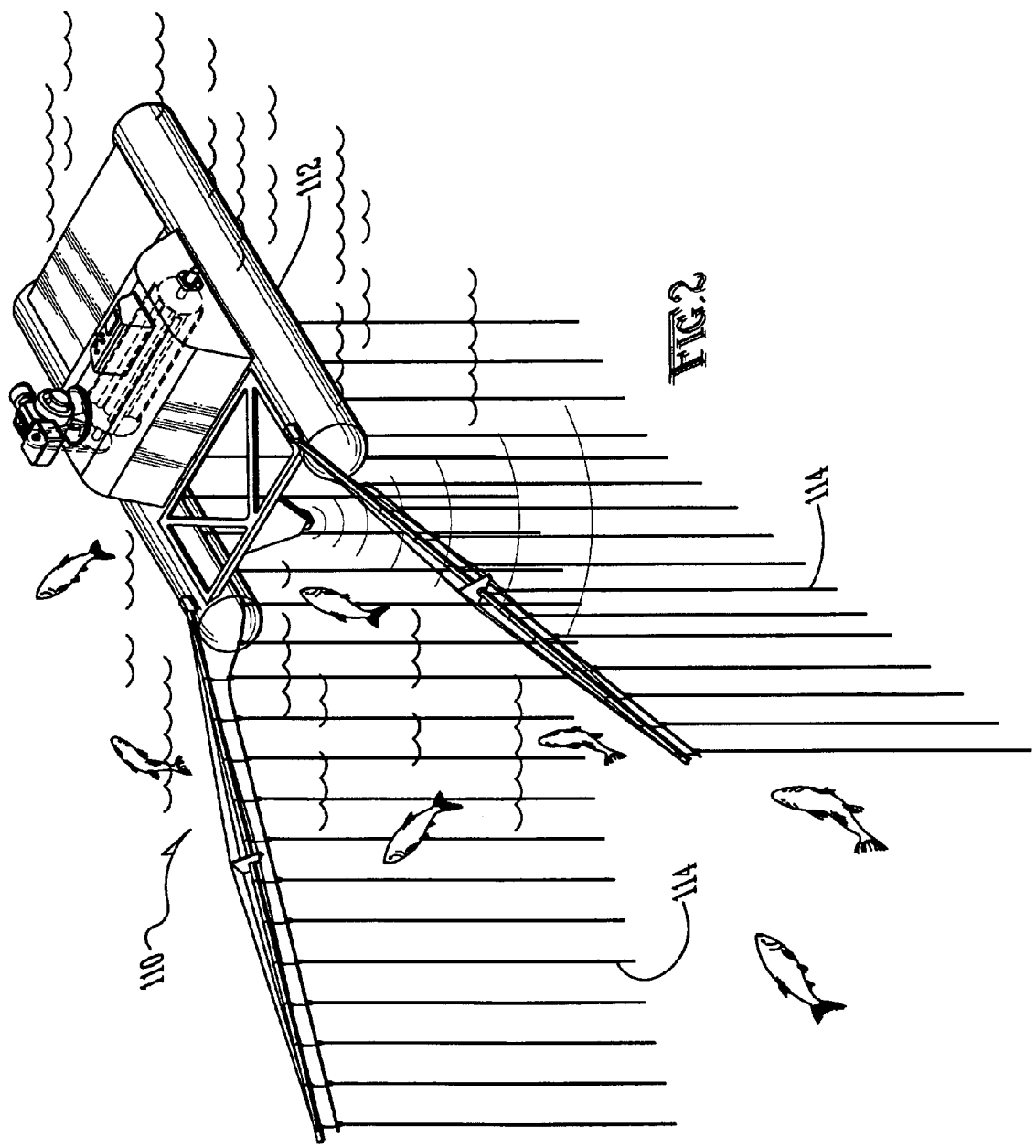
FIG. 2 is a perspective view of apparatus for nuisance-carp control measures in accordance with the invention.
Figure 3:
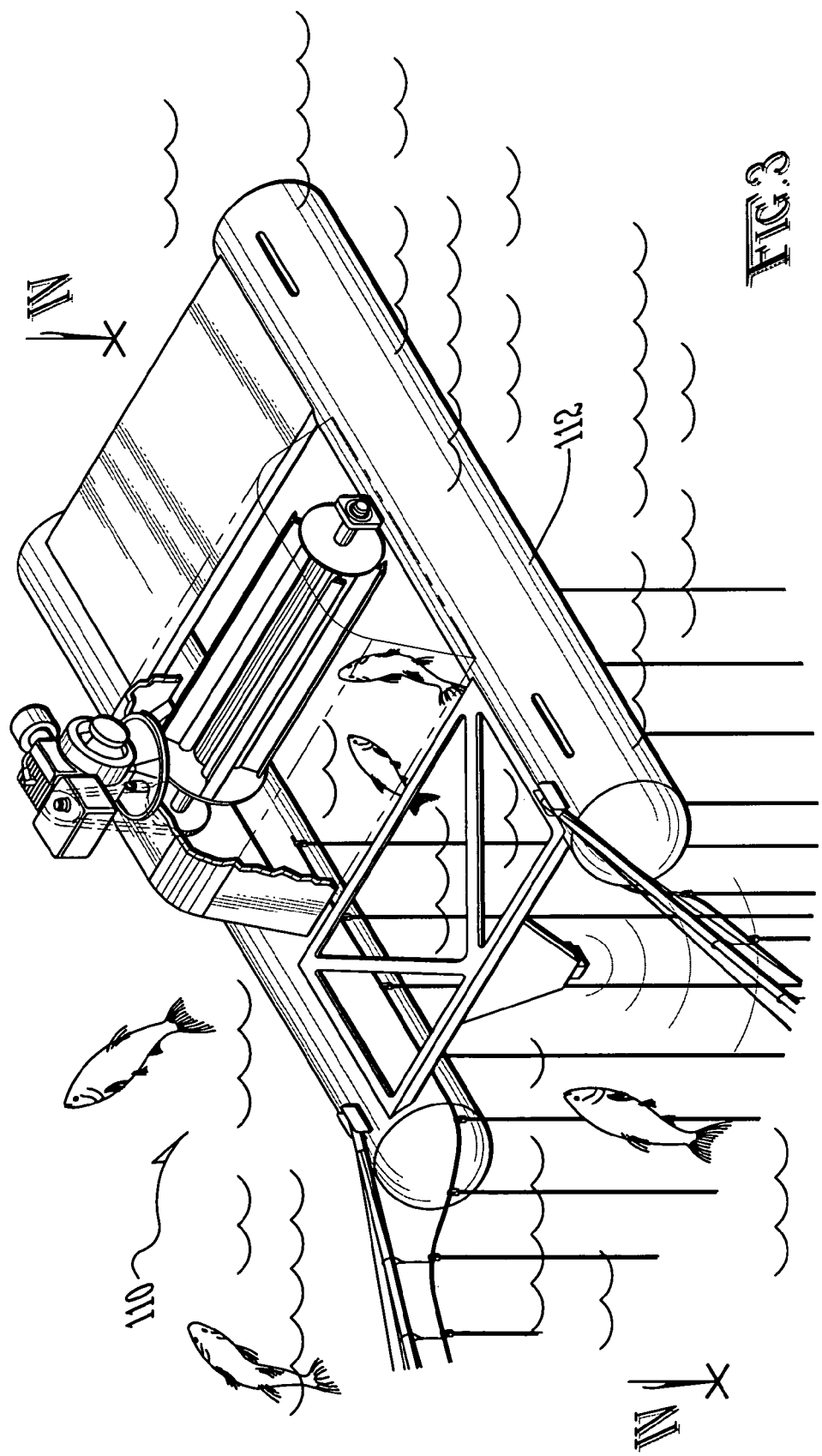
FIG. 3 is comparable to FIG. 2 except on an enlarged scale.
Figure 4:
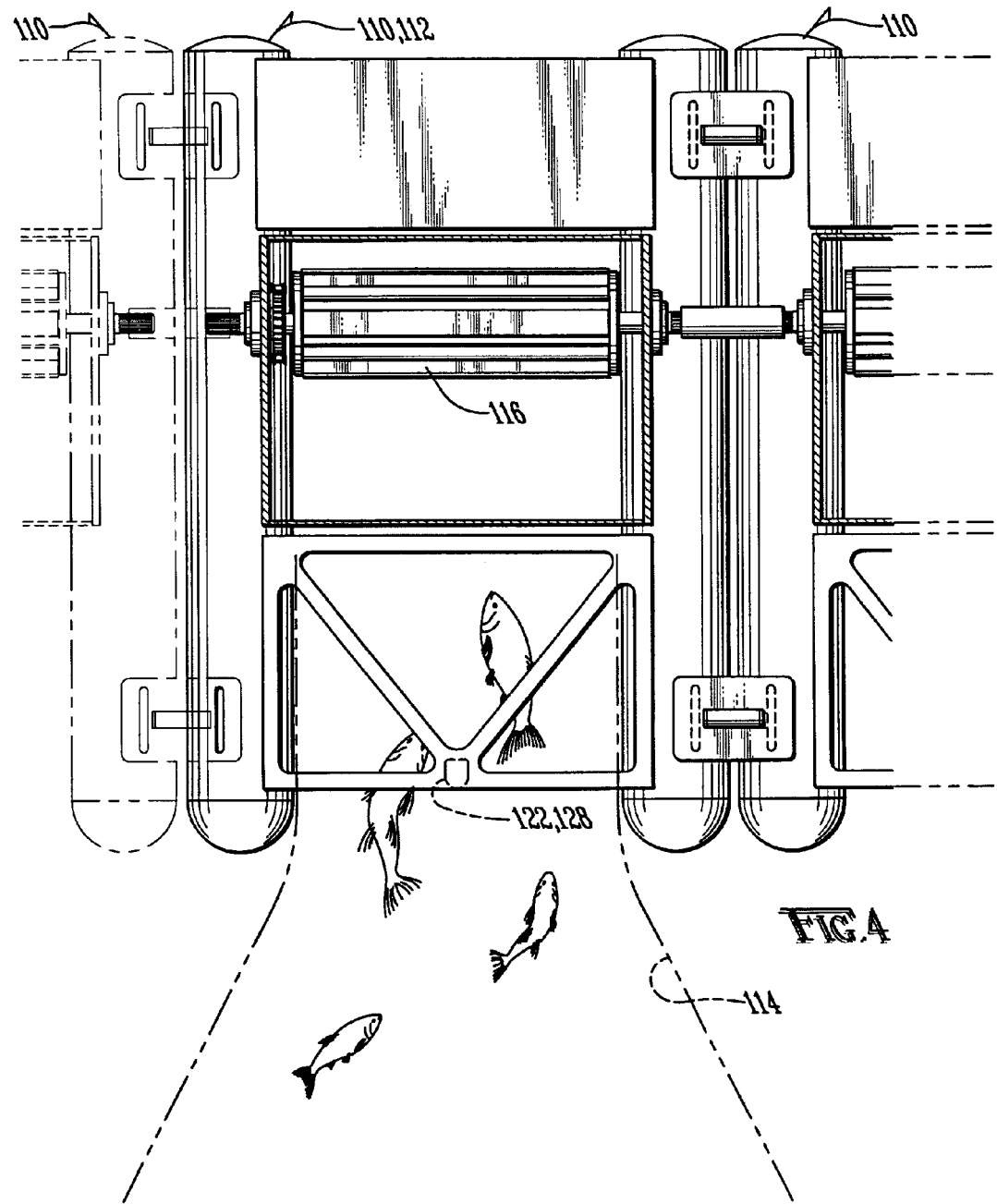
FIG. 4 is an top plan section taken along the line IV-IV in FIG. 3.

Fire
Water spray
Paddles
BB's
Electrocution
Air blower
Blades
Chain saw
Scalding hot water
Hot grid
Grinders FIGS. 2 through 4 provide an illustration of one exemplary embodiment of apparatus 110 for nuisance-carp control measures in accordance with the invention.

A raft 112 of a pair of spaced pontoons carry a horizontal-axis impeller 116. An electrified weir 114 spreads out in front of the raft 112 to aid in funneling fish under the impeller 116. A combination detector/stimulus device 122, 128 is providing signals into the water below the raft to determine the occurrence or near-occurrence of fish swimming within an effective proximity of the impeller 116 and, in the event of such determination, the same device 122, 128 is available for triggering the stimulus impulse.

FIG. 4 shows that a plurality of like apparatus 110 with the raft design can be moored in linear arrays to create broad fronts (as shown) or in arrays with ranks behind the front rank (eg., line) to provide depth (not shown) in order to expand the overall effective area of the harvest impellers 116 as an array.

The impeller 116 is show as configured with axially-straight vanes. FIG. 5 shows an alternate design for the harvesting impeller 117, one with reel-lawnmower style helical blades. FIG. 6 is a view comparable to FIG. 5 except showing still another design for the harvesting impeller 118, this one comprising a flail design. FIG. 7 is a view comparable to FIGS. 5 and 6 except showing a vertical-axis impeller 119.

FIG. 8 shows an alternative embodiment for apparatus 210 in accordance with the invention to control nuisance carp populations. The base 212 for the harvest measures 216 comprises a self-propelled watercraft. The harvest measures 216 comprise a battery of fowling pieces or the like:—such as projectors like air cannon or scatter-shot guns that broadcast a mass of pellets but only with a short effective range. Preferably the pellets are environmentally neutral to friendly, including comprising feed pellets. That way, the activity of harvesting nuisance fish concurrently enriches the aquatic environment for more desirable fishes.

In FIG. 8, the pellet cannon 216 are preferably aimed for fish leaping out ahead of the watercraft 212. An electrified weir 214 is supported forward of the watercraft 212 to funnel fish inwards from lateral lanes away from the outboard beam of the watercraft 212 to a relatively central aisle straight before the watercraft 21 in order to improve the chances of the pellet cannon 216. It is an aspect of the invention that the transducer 222 is placed to detect if fish have swum within an effective proximity of the pellet cannon 216 and, if so, then through processing of the fish locator 224 and controller 226 automatically do the following. It is one aspect of the invention that the controller 226 automatically switch on the stimulus device 228 and/or 228 in combination with 214. for further being capable of automatically controlling the operations of the harvest apparatus. It is another aspect of the invention that the controller 226 functions like a cannon "fire control," and discharge the cannon at times chosen to coincide the effectiveness of the harvesting leaping fish, if any. It is a further aspect of the invention, among others still, that the controller 226 automatically controlling the aim of the pellet cannon 216, either by un-targeted sweeping maneuvers or targeted aims provided by microwave or ultrasonic sensors (not shown) operative in air.

Figure 9:
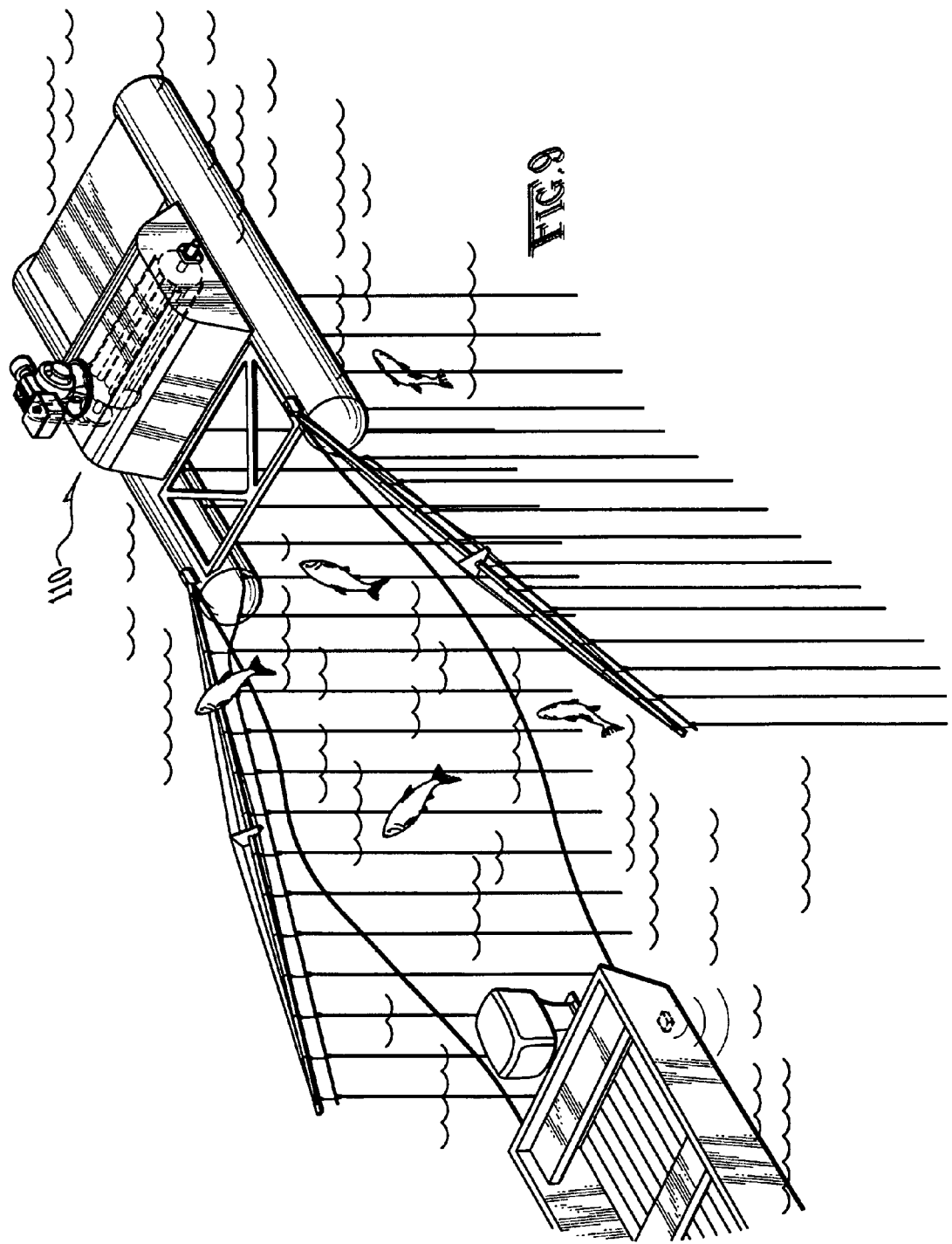
FIG. 9 is a perspective view of an additional embodiment for apparatus in accordance with the invention to control nuisance carp populations.

FIG. 9 is a perspective view of an additional embodiment for apparatus in accordance with the invention to control nuisance carp populations;

FIG. 9 shows the harvest station 110 of FIGS. 2 through 4 but not stationary as before but now mobile as being towed behind a motorized watercraft. The pilot of the watercraft has the option of towing the harvest station 110 behind him or her wherever he or she wishes, depending upon the most areas with the most-expected highest concentrations of the nuisance carp.

Figure 10:
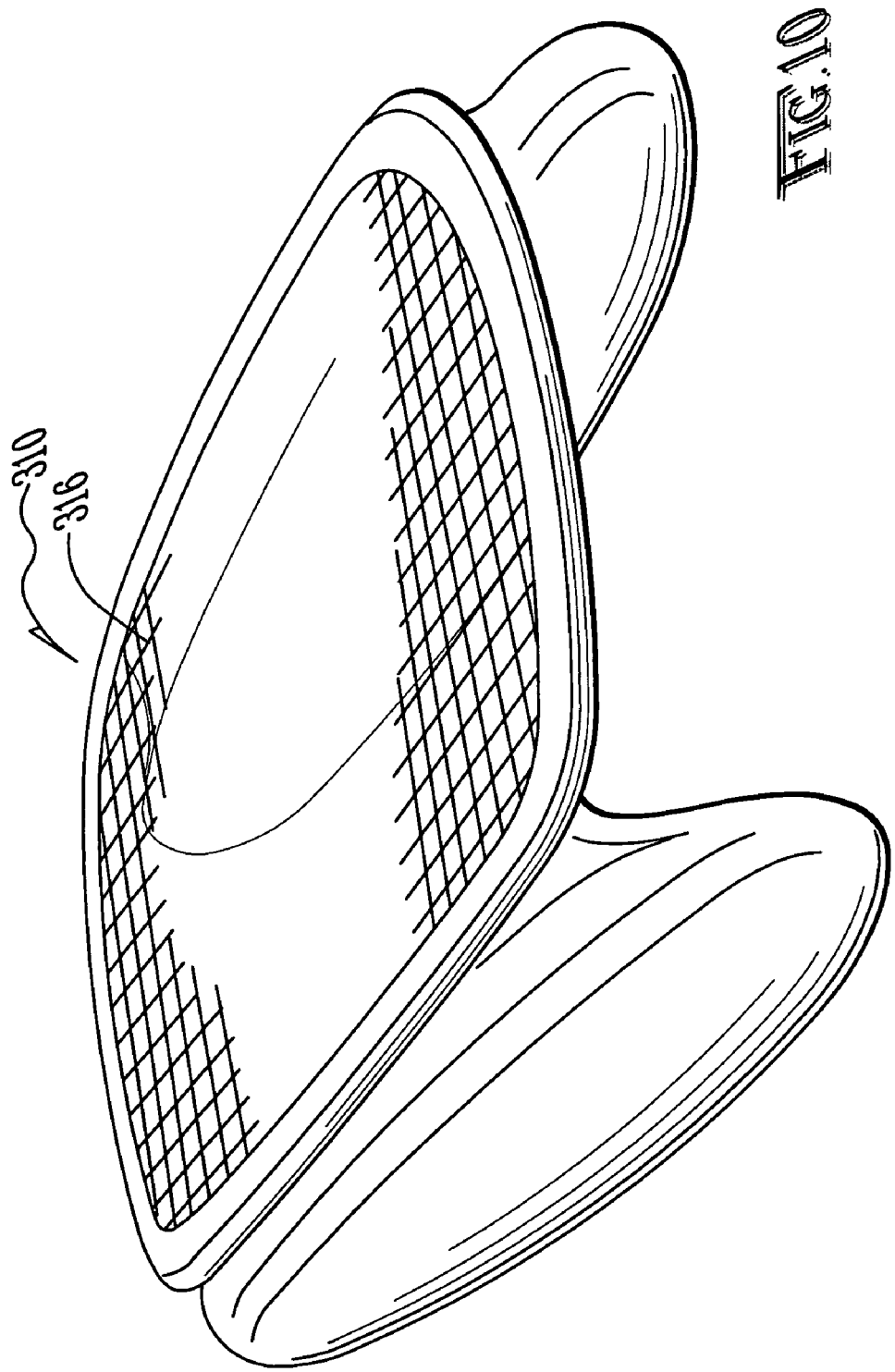
FIG. 10 is a perspective view of another embodiment for apparatus in accordance with the invention to control nuisance carp populations.

FIG. 10 shows a harvest apparatus 310 comparable to apparatus 110 of FIGS. 2 through 4 and 9 except having a web spanning between the two pontoon comprising a fish-zapping electrified grill, something like a bug zapping device.

FIG. 11 shows a further embodiment for apparatus 410 in accordance with the invention to control nuisance carp populations. This apparatus 410 is a combination of a wall of jets 416 that not only deliver a debilitating blast to the leaping fish but also knock them into a nearby collecting barge 430. The jets can be blasts of water (pumped from the waterway itself), air, or perhaps flame or pyrotechnic devices (the latter which might more knock the fish into the collecting barge 430 by concussion than anything else).

Whereas FIG. 11 is a side view, the vertical column of jets 416 is preferably arrayed in multiple columns (all but the nearside column hidden from view), to present a virtual wall of jets 416 to hurl the fish against a backstop on the collecting barge 430 for collection in the hold of the barge 430 thereafter.

The barge 430's backstop is shown being provided with a rinse of pumped water to make it slick and improve the effectiveness at allowing the stopped fish at sliding down into the hold of the collecting barge 430.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A system for controlling nuisance-carp populations, comprising:
   a harvest apparatus for harvesting not sub-surface fish but fish that leap out of the water proximate said harvest apparatus;
   a base for supporting the harvest apparatus in an operative position; and a stimulus for stimulating the nuisance-carp to leap out of the water proximate the harvest apparatus;

wherein said harvest apparatus is selected from the group consisting of: a driven horizontal-axis impeller, a driven vertical-axis impeller, a fish-zapping electrified grid and an automated projector.

2. The system of claim 1 wherein:
the base comprises a floating platform anchored stationary.

3. The system of claim 2 further comprising:
outspread barriers for diverting swimming fish toward said base.

4. The system of claim 3 wherein:
said barriers comprise submerged, electrified weirs.

5. The system of claim 2 further comprising:
a detector for detecting if fish have swum within an effective proximity of the harvest apparatus; and
a controller, linked to the detector and stimulus, for determining through the detector the occurrence or near-occurrence of fish swimming within an effective proximity of the harvest apparatus and, in the event of such determination, for further being capable of triggering the stimulus.

6. The system of claim 5 wherein:
the controller is further configured for determining whether some of the fish exceed a pre-defined size threshold and, in the event of determining both the occurrence or near-occurrence of fish swimming within an effective proximity of the harvest apparatus as well as that some of the fish exceed a pre-defined size threshold, then triggering the stimulus.

7. The system of claim 5 wherein:
the harvest apparatus is configured to rest at idle until triggered to operate; and
the controller is further configured for, in the event of determining the occurrence or near-occurrence of fish swimming within an effective proximity of the harvest apparatus, triggering the harvest apparatus as well and according to a timing chosen to coincide the effectiveness of the harvest apparatus against the leaping fish, if any.

8. The system of claim 1 wherein:
said base comprises an anchored raft having a pair of spaced pontoons with said harvest apparatus spanning therebetween, with said harvest apparatus being effective predominantly against fish leaping between the thereby affording opportunity to expand the effective reach of the harvest apparatus by aligning plural of said rafts in a pattern.

9. The system of claim 1 further comprising:
a self-propelled watercraft towing said base behind said watercraft for harvesting fish leaping intermediate the watercraft and towed base.

10. The system of claim 9 further comprising:
a self-propelled watercraft towing said base behind said watercraft for harvesting fish leaping intermediate the underway watercraft and the towed base.

11. The system of claim 10 further comprising:
motivators for motivating fish swimming in a lateral zone lane outboard of the underway watercraft and beyond an effective range of the harvest apparatus to move inwards and thus improving the chances of the harvest apparatus.

12. The system of claim 11 wherein:
said motivators comprise an oblique electrified weir to motivate fish inwards.

13. The system of claim 1 wherein:
said base comprises a self-propelled watercraft;
said harvest apparatus is a projector, wherein the projector is air operated and mounted for mass projection of lethal measures at fish leaping around watercraft.

14. The system of claim 13 further comprising:
a detector for detecting if fish have swum within an effective proximity of the harvest apparatus; and
an automatic controller, linked to the detector, for determining through the detector the occurrence or near-occurrence of fish swimming within an effective proximity of the harvest apparatus and, in the event of such determination, for further being capable of automatically controlling the operations of the harvest apparatus.

15. The system of claim 14 wherein,
said automatic controller is configured for controlling either an air supply for the projector or an ON-OFF operation of the harvest apparatus.

16. The system of claim 13 wherein:
said harvest apparatus is configured for mass scattering of lethal measures comprising feed pellets.

17. The system of claim 13 wherein:
said harvest apparatus is mounted for targeting fish leaping predominantly ahead of the underway watercraft.

18. The system of claim 17 further comprising:
motivators for funneling fish swimming in lateral lanes outboard of the underway watercraft relatively inwards and thus improving the chances of the harvest apparatus.

19. The system of claim 18 wherein:
said motivators comprise a forward spreading electrified weir to funnel fish inwards.

\* \* \* \* \*